3,575,897
FOAMED FLUORINATED HYDROCARBON POLYMERS

William S. Port, Andover, and Arthur R. Taverna, Lexington, Mass., assignors to Avco Corporation, Cincinnati, Ohio
No Drawing. Continuation of application Ser. No. 546,620, May 2, 1966. This application June 6, 1969, Ser. No. 832,555
Int. Cl. B29d 27/00; C08f 3/22, 47/10
U.S. Cl. 260—2.5                                                 4 Claims

ABSTRACT OF THE DISCLOSURE

A method of making a low density polymeric foam through the utilization of a foaming agent which dissociates reversibly under the control of temperature and pressure.

---

This application is a continuation of application Ser. No. 546,620 filed May 2, 1966, and now abandoned.

This invention relates to foamed polymers and more particularly to a process for making a low density cellular polymeric material.

Generally, there are many known methods for foaming plastics and resins which require the formation of a gas under critical temperature or process conditions. For example, one such process for the preparation of foamed polyurethanes provides that a gas be employed which gas arises as part of the reaction in the process of forming the polymer. Although such a method has proved successful in producing polyurethane foams, it is highly specialized and not applicable to foaming types of polymers wherein the polymeric material has already been formed.

Another method which has proved successful for foaming plastics uses chemicals such as azo compounds which decompose irreversibly to a gas over a narrow temperature range. Many of these compounds decompose at a temperature below the fusion temperature of the polymer which is to be foamed such as with halocarbon polymers. The method, therefore, cannot be used to produce a low density polymeric material from these polymers.

It has been suggested to use liquids which have low boiling points and are moderately soluble in the plastic to be foamed to achieve a cellular product from the halocarbon polymers. However, such liquids which are suitable for use with plastics such as the above-mentioned halocarbon polymers are few in number and generally are relatively expensive.

Another method of producing low density plastics involves incorporation of hollow spheres of material, for example glass, in the plastic material. However in many instances the inclusion of such a foreign material is deleterious to the basic material, and the method is highly unsatisfactory.

This invention therefore, has an object to provide a process for making a low density cellular polymeric material by foaming a thermoplastic resin which has already been formed.

A further object of the invention is to facilitate foaming of plastic materials such as the halocarbon polymers.

Another object of the invention is to provide a process for making a low density cellular polymeric material wherein the density of the product is easily controlled.

Another object of the invention is to provide a process for making a low density cellular polymeric material by a foaming process, wherein the foaming agent may be simply and economically removed from the material.

Yet another object of the invention is to provide a process for making a low density cellular polymeric material which process is relatively rapid and simple in operation.

These objects, and other objects which will be apparent as the description proceeds, are achieved by the novel process which is employed with a plastic resin, in the form of a thermoplastic polymer.

As a foaming agent in the process, a compound is used which dissociates reversibly with increasing temperature and decreasing pressure to form gaseous components. The compound chosen may be in either the solid or liquid state and is selected from those compounds which develop appreciable pressures at temperatures below the flow temperatures of the chosen polymer.

In the process to be described, the thermoplastic polymer and the chosen compound in the desired ratio are thoroughly mixed by any convenient means well known in the art. The mixture is then placed in a mold provided with a ram or any suitable mold having means for applying external pressure to the mixture confined therein.

The mold is then closed, and the temperature raised to the temperature range in which fusion and flow of the thermoplastic polymer occur. During this temperature rise, the mixture is retained at a substantially constant volume by application of external pressure to the mold. The degree of pressure applied to the mixture to retain it at a constant volume is in a pressure range above that pressure at which the compound will appreciably dissociate.

The temperature is then lowered slightly to that temperature at which the plastic is at a sufficiently high viscosity to produce a good quality foam. The volume of the mixture is then allowed to increase to that volume corresponding to a predetermined, desired polymer density. In the device described, the ram is slowly withdrawn from the mold thereby increasing the volume, and lowering the pressure below that pressure at which substantial dissociation of the compound occurs. The foaming process occurs as the compound dissociates to a gas, and the mixture completely fills the new volume of the mold.

The pressure is then lowered in a controlled manner sufficient to maintain the desired volume as the temperature is gradually lowered, first to that temperature at which flow of polymer will not occur, and finally to that temperature at which the compound is essentially no longer dissociated.

It has generally been found that a relatively small amount of the compounds used are capable of producing large volume change when converted to a gas, and therefore only a small amount of the compound need be used for a great many applications.

The following example illustrates a way in which the principle of the invention has been applied, but is not to be construed as limiting the scope thereof.

A mixture was prepared using 75 gms. of a powder (35 mesh) of a copolymer of tetrafluorethylene and hexafluoropropylene sold by Du Pont Chemical Corporation under the trade name of Teflon FEP. The second ingredient of the mixture consisted of 25 gms. of ammonium chloride powder (100 mesh). The mixture was dry blended by shaking the ingredients for approximately 30 minutes to thoroughly mix the components.

The mixture was then placed in a mold similar to that previously described having a movable ram through which external pressure may be applied to the contents of the mold to control the volume thereof.

The mold was heated to 600° F. while maintaining a sufficient external pressure on the ram to prevent an appreciable change in volume of the mixture. As a result of the temperature rise of the mixture, an increase in pressure within the mold was caused by small dissociation of the compound to a gas. The mixture however, is retained at a constant volume by applying pressure to the ram, and the pressure increase above that value at which the compound will appreciable dissociate.

After the mixture was maintained at 600° F. for 5 hours to completely fuse the Teflon FEP material, the plunger was allowed to move freely in the mold to that point at which a volume of material was produced which would be of the desired density. The temperature of the mold was then brought back to room temperature and the billet removed from the mold.

In this application it was desired to remove the ammonium chloride compound which has returned to its solid state, from the resultant billet. As the ammonium chloride is soluble in water, this was accomplished by placing the billet in boiling water to leach out the ammonium chloride, after which the billet was dried in a vacuum oven to remove the moisture present in the cells.

After the leaching operation, the density of the resultant foam billet was measured and was found to be between .9 and 1.0 while the theoretical density of the materials used would be in its pre-foamed state in the order of about 1.67.

Plastics which have flow properties making them suitable for the above described process include copolymers of tetrafluorethylene and hexafluoropropylene, polychlorotrifluorethylene, polyvinylidene fluoride and copolymers of vinylidene fluoride and hexafluoropropylene.

As was stated above, the compound chosen for foaming the plastic is one which dissociates reversibly to a gas to an extent which depends directly with temperature and inversely with pressure. A specific class of reversibly decomposable materials which may be employed in the mixture is the class of ammonium salts of strong acids. Among the suitable reversibly decomposable components are ammonium chloride, ammonium bromide and ammonium sulfate.

Although in the above example about 25% of the mixture consisted of the reversible compound, it should be here noted that as little as about 1% of the compound produces a useful product, while in most applications, from 2 to 5% by weight of compound would be preferred.

Furthermore, when the gaseous products recombine to form the original compound, the space occupied by the compound is relatively small. For that reason, in most applications it is not necessary to remove the compound from the resultant cellular material. However, if it is desirable to remove the compound from the final cellular product, a compound should be chosen which is soluble in a solvent which does not attack the chosen polymer.

The above described process further, may be employed to produce either an open cell or a closed cell structure. It will be obvious that for those applications where it is desired to remove the compound from the end product, an open cell structure product would be desirable.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. A process for making a low density cellular polymeric material which comprises the steps of:
    providing a mixture comprising a copolymer of tetrafluorethylene and hexafluoropropylene, and ammonium chloride,
    heating the mixture to the fusion temperature of the copolymer and simultaneously applying to the mixture a pressure of the magnitude greater than that pressure required to prevent appreciable dissociation of the ammonium chloride to a gas,
    reducing the pressure applied to the mixture to dissociate the ammonium chloride to a gas to provide foam expansion of the mixture to a predetermined density, and
    cooling the mixture to a temperature below that temperature at which resin flow occurs.

2. The process of claim 1 wherein the mixture comprises from about 1% to 25% by weight of the ammonium chloride.

3. The process of making a low density cellular polymeric material which comprises the steps of:
    providing a mixture consisting essentially of a thermoplastic resin taken from the class consisting of copolymers of tetrafluorethylene and hexafluoropropylene, polychlorotrifluorethylene, polyvinylidene fluoride and copolymers of vinylidene fluoride and hexafluoropropylene and a compound taken from the class consisting of ammonium chloride, ammonium bromide and ammonium sulfate, heating the mixture to the fusion temperature of the resin and simultaneously dissociating said compound to a gas and allowing expansion of the mixture into a foam by the dissociation of the compound to a gas; and
    cooling the mixture to a temperature below that temperature at which the resin flow occurs.

4. The process of claim 3 wherein the mixture comprises from about 1% to 25% by weight of the compound.

References Cited
UNITED STATES PATENTS

| | | | |
|---|---|---|---|
| 3,398,215 | 8/1968 | Spenadel et al. | 264—45 |
| 2,603,622 | 7/1952 | Berger et al. | 260—2.5 |
| 2,997,448 | 8/1961 | Hochberg | 260—2.5 |

MURRAY TILLMAN, Primary Examiner

WILBERT J. BRIGGS, Sr., Assistant Examiner

U.S. Cl. X.R.

260—87.5, 87.7, 92.8; 264—51, 53